(12) United States Patent
Bergmann

(10) Patent No.: US 6,478,285 B1
(45) Date of Patent: Nov. 12, 2002

(54) ELECTRICALLY OPERATED FITTING

(75) Inventor: Konrad Bergmann, Schweich (DE)

(73) Assignee: Ideal-Standard GmbH & Co. OHG, Bonn (DE)

( * ) Notice: Subject to any disclaimer, the term of this patent is extended or adjusted under 35 U.S.C. 154(b) by 0 days.

(21) Appl. No.: 09/380,623

(22) PCT Filed: Mar. 10, 1998

(86) PCT No.: PCT/EP98/01384

§ 371 (c)(1), (2), (4) Date: Sep. 17, 1999

(87) PCT Pub. No.: WO98/41787

PCT Pub. Date: Sep. 24, 1998

(30) Foreign Application Priority Data

Mar. 17, 1997 (DE) .......................... 197 10 800

(51) Int. Cl.⁷ .............................. F16K 31/05
(52) U.S. Cl. ........................... 251/129.03; 251/129.04; 4/596
(58) Field of Search ................ 251/129.01, 129.03, 251/129.04; 4/596, 598, 605

(56) References Cited

U.S. PATENT DOCUMENTS

| 4,696,428 A | * | 9/1987 | Skalalis ................. 236/12.12 |
| 4,797,820 A | * | 1/1989 | Wilson et al. ............. 4/605 X |
| 4,842,191 A | * | 6/1989 | Bergmann ......... 251/129.03 X |
| 4,945,943 A | | 8/1990 | Cogger |
| 4,965,894 A | * | 10/1990 | Baus ........................ 4/605 |
| 4,967,935 A | * | 11/1990 | Celest ..................... 4/605 X |
| 4,974,636 A | * | 12/1990 | Cogger ............. 251/129.04 X |
| 5,032,992 A | * | 7/1991 | Bergmann ................ 364/550 |
| 5,137,051 A | * | 8/1992 | Laur et al. ........ 251/129.04 X |
| 5,199,118 A | | 4/1993 | Cole |
| 5,329,650 A | * | 7/1994 | Zaccai et al. ............. 4/596 X |
| 5,459,890 A | * | 10/1995 | Jarocki ..................... 4/598 X |
| 5,611,517 A | * | 3/1997 | Saadi et al. ............ 251/129.04 |
| 5,988,588 A | * | 11/1999 | Allen et al. ............ 251/129.04 |

FOREIGN PATENT DOCUMENTS

| DE | 74 34 476.6 | 10/1974 |
| DE | 30 25 603 | 2/1982 |
| DE | 88 10 834 | 10/1988 |
| DE | 90 16 466.0 | 4/1991 |
| DE | 91 12 255 | 11/1991 |
| DE | 296 20 414 | 1/1997 |
| EP | 0 066 034 | 12/1982 |
| EP | 0 758 702 | 2/1997 |

OTHER PUBLICATIONS

Ikz–Haustechnik, Vom Netz Befreit, Mehr Modernisierungschancen Mit Der Batterie–Elektronik, Gerd Fasthoff et al., Heft, Oct. 1992, pp. 39–41.

* cited by examiner

*Primary Examiner*—Henry C. Yuen
*Assistant Examiner*—Eric Keasel
(74) *Attorney, Agent, or Firm*—Nixon Peabody LLP; David S. Safran

(57) ABSTRACT

An electrically operated fitting with a fitting body that has a valve arrangement and an electrically operated drive arrangement for operating the valve arrangement. In order to produce an electrically operated fitting which is of simple and economic construction while having an attractive aesthetic design, a housing is provided for mounting purposes, in particular, for sealing abutment with an installation wall. Disposed on the housing is an actuating arrangement for an electronic unit for controlling the drive arrangement.

15 Claims, 4 Drawing Sheets

ELECTRICALLY OPERATED FITTING

BACKGROUND OF THE INVENTION

1. Field of the Invention

The invention relates to an electrically operated fitting with a fitting body which has a valve means and an electrically operated drive means for the valve means.

2. Description of the Related Art

An electrically operated fitting of the initially mentioned type is already known from practice. In the known fitting, there are switches on the fitting body for actuating the drive means. Placing the switches on the fitting body makes it complex to build. In addition, the design of this known fitting leaves much to be desired. Finally, cleaning of the fitting in the area of the switches becomes difficult.

SUMMARY OF THE INVENTION

The object of the invention is, therefore, to make available an electrically operated fitting of the initially mentioned type which is simple and economical to build and which in addition has a pleasing, aesthetic form.

In an electrically operated fitting of the initially mentioned type, in accordance with the present invention, this object is essentially achieved by there being a housing for attachment and especially for sealing contact against the installation wall and by there being an actuation device of an electronic module on the housing for triggering the drive means. In the invention therefore the actuation means is moved from the fitting body to a separate housing which can be attached to the installation wall. The fitting body can, therefore, be made simply and economically in the conventional manner, while the housing with the actuation means is used for actuation and can be easily cleaned. The housing in the installed state is preferably sealed relative to the installation wall so that water cannot splash behind the housing and collect there.

Feasibly, the housing has not only the actuation means, but also the electronic module which is especially integrated into the housing, therefore is made in one piece with it. The housing with the actuation means and the electronic module can be easily installed as a unit, and in case of repair, can be removed easily. The inside and outside seal of the electronic module relative to the housing ensures that no malfunctions occur.

To impart a pleasing design to the housing, there is a cover to be placed on the housing to essentially conceal the housing. In the cover, there is an opening which unblocks the actuation means on the housing. The cover offers the advantage that, on the one hand, attachment points, connections or openings in the housing are not visible from the outside and that, on the other hand, when using one type of housing, via the cover different external designs can be chosen according to taste.

It is especially advantageous when the housing conceals the fitting body and/or the drive means, preferably completely. In this case, the entire fitting body with the drive means disappears behind the housing and can no longer be recognized from the outside. With a corresponding seal of the housing relative to the installation wall, it is guaranteed that water cannot splash behind the housing, which could adversely affect the operation of the electrically operated fitting.

Good attachment and a reliable seal of the housing on the installation wall can be achieved, for example, via screw connections, the housing being attached to the installation wall, the drive means and/or the fitting body and being drawn against the installation wall as screwing is being done and seals against the installation wall.

Other features, advantages and possible applications of this invention follow from the following description of embodiments using the drawings and the drawings themselves.

DETAILED DESCRIPTION OF THE INVENTION

Figure 1:
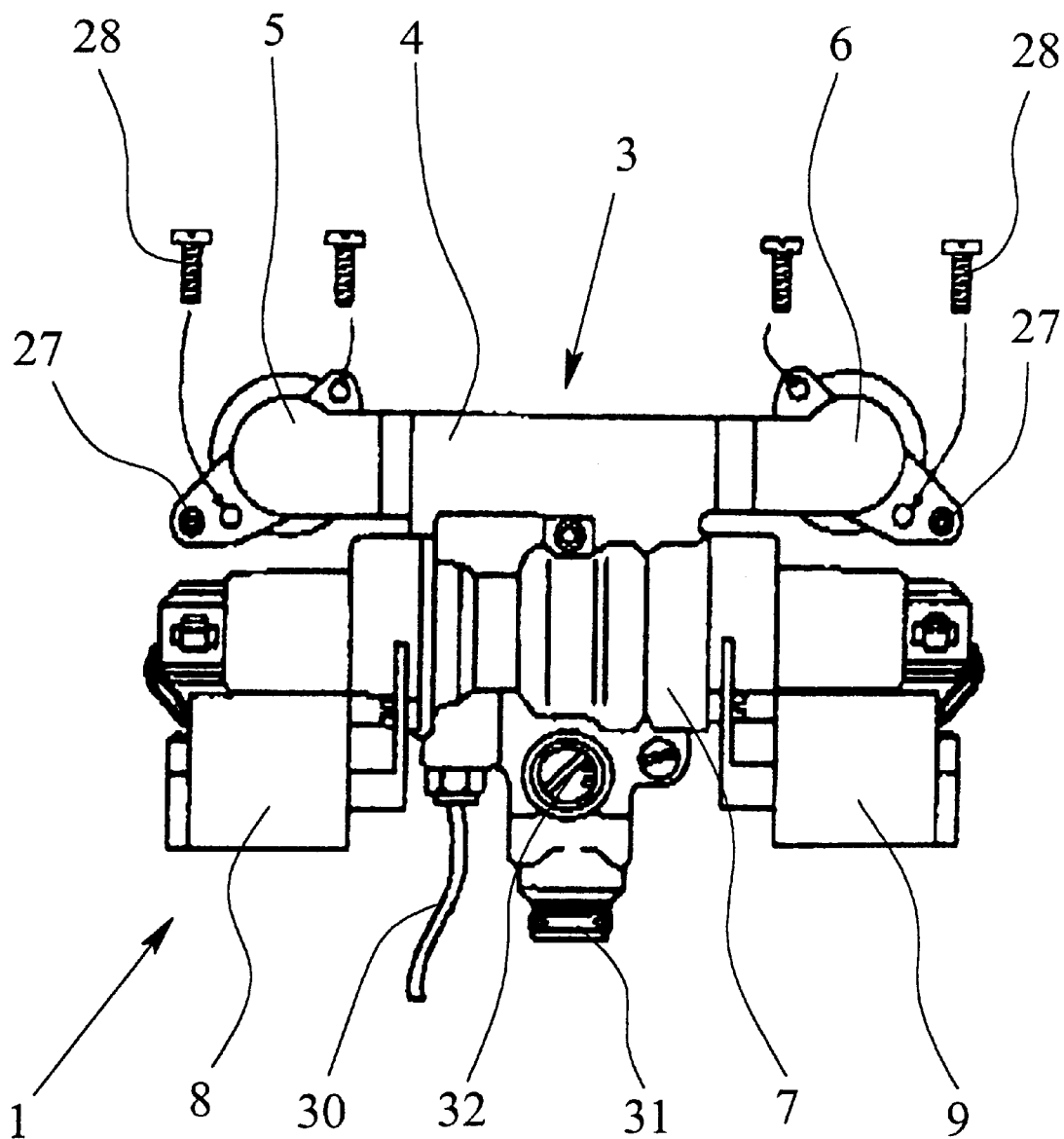
FIG. 1 shows an overhead view of a fitting as claimed in the invention without the housing.

In the figures, one electrically operated fitting 1 is shown at a time, the fitting being a surface-type fitting for attachment to an installation wall 2. The fitting could also be a flush-mounted fitting. The fitting 1 has a fitting body 3 which is provided with a supply housing 4 with a hot water supply 5 and a cold water supply 6. Furthermore, the fitting 1 has a valve means 7 which is located within the fitting body 3 and which is not detailed. The valve means 7 is used for cutting off and mixing hot and cold water.

While the hot water supply 5 and the cold water supply 6 are located in a common supply plane, which in the installed state of the fitting, runs roughly at a right angle to the installation wall 2, the valve means 7 is not located in the supply plane, but underneath this supply plane. It goes without saying that the valve means could, of course, also be located above the supply plane. This arrangement underneath one another yields a very low construction depth of the fitting 1.

The valve means 7, which is not explained in detail, in particular, has a thermostatic mixing valve unit (not shown) and a cutoff valve unit. The mixing valve unit is used to mix hot water and cold water to produce mixed water of stipulated temperature. The cutoff valve unit is used to open and close the fitting 1 and for adjusting the amount. Feasibly, the cutoff valve is located in the flow direction behind the mixing valve unit.

In addition to the fitting body 3, the fitting 1 has another electrically operated drive means for the valve means 7. In this embodiment, the drive means has two servomotors 8, 9 which are each connected via a corresponding transmission to the mixing valve unit or the cutoff valve unit. The valve means 7 can be adjusted via the servomotors 8, 9 for adjusting temperature and amount of the water.

It is significant here that a housing 10 is assigned to a fitting 1 and is designed for attachment and especially for sealing contact against the installation wall 2. There is a control panel 11 of an electronic module 12, outside on the housing 10, for triggering the drive means. The control panel 11 has a keyboard 13 and a display 14. The keyboard 13 and the display 14 are located on a board which is not shown and which is part of the electronic module 12. The housing 10 is made in one piece with the control panel 11 and the electrical module 12. The control panel 11 and also the electronic module 12 are both sealed on the front and back relative to the housing 10 such that water cannot reach the electronic and electrical components of the control panel 11 and/or the electronic module 12.

Furthermore, there is a cover 15 to be placed on the housing 10. The cover has an opening 16 which opens to the control panel 11, but otherwise completely conceals the housing 10. In this embodiment, the cover 15 is made in one piece in the manner of a lid. In any case, multi-piece versions are possible, for example, there being two cover parts which run vertically and two which run horizontally.

Figure 4:
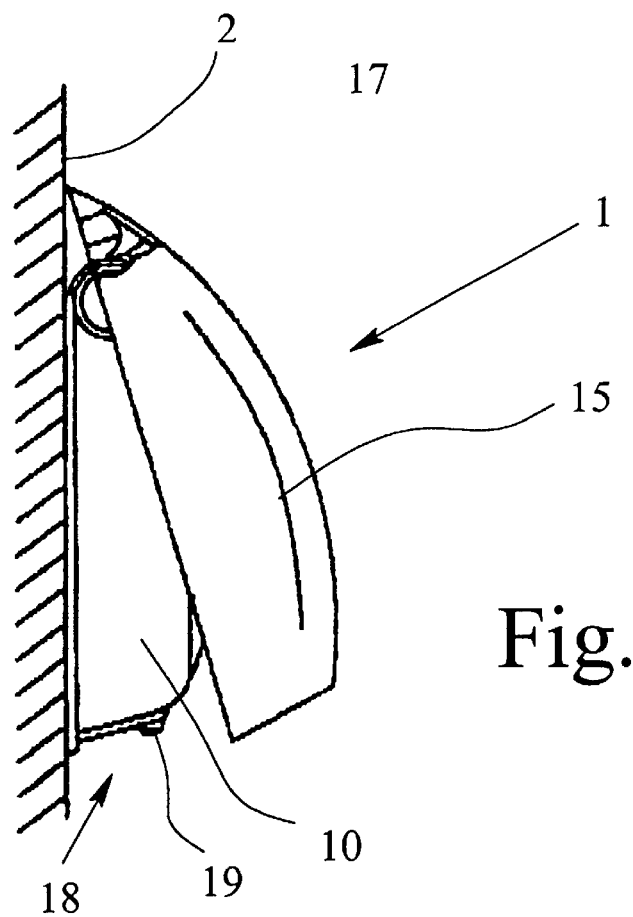
FIG. 4 shows a side view of the fitting as claimed in the invention with the housing swivelled out and FIG. 5 shows a perspective view of a fitting as claimed in the invention in the assembled state.

As follows from FIG. 4, the cover 15 can be detachably joined to the housing 10. Between the housing 10 and the cover 15, there is a pivot bearing 17 which is located on the top end of the housing 10. Opposite the pivot bearing 17, therefore on the bottom end of the housing 10 and the cover 15, there is a catch connection 18. The catch connection 18 has a spring-loaded catch pin 19 which is supported on the housing 10 and a catch opening which is not shown and which corresponds to the catch pin 19.

Figure 3:
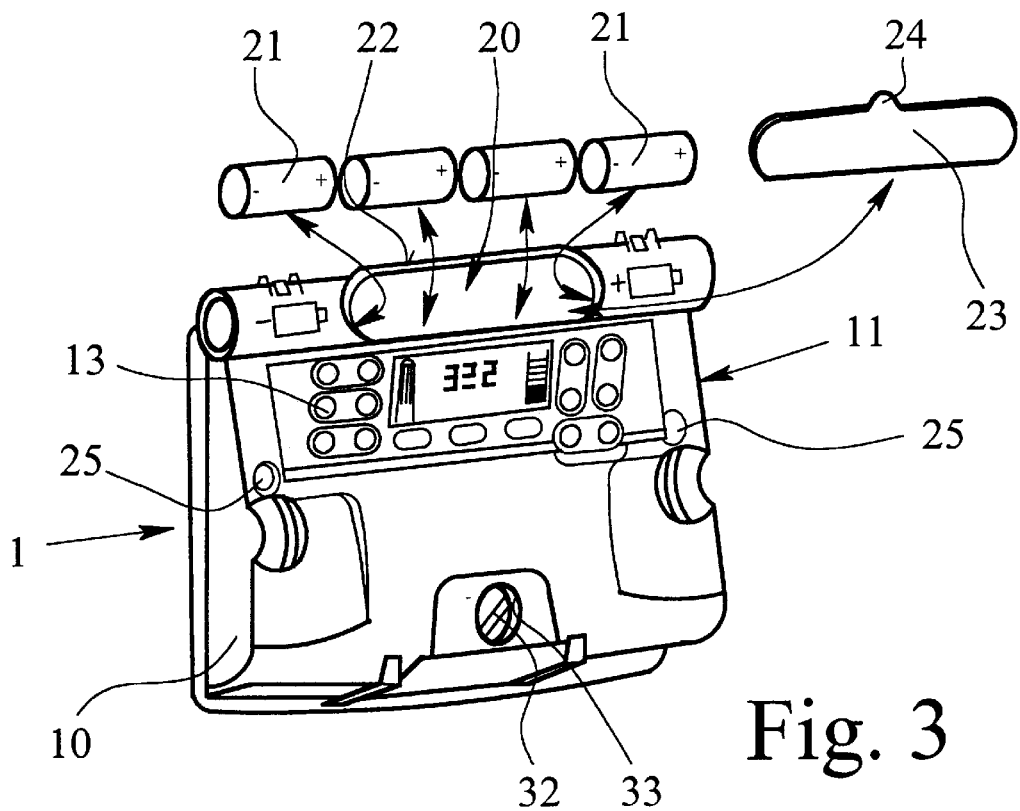
FIG. 3 shows a perspective view of the fitting with the housing attached to the installation wall.

The fitting 1 is battery-operated in this embodiment, and for this reason, has a battery compartment 20. The battery compartment 20 has an elongated, especially tubular shape. The battery compartment can hold a row of batteries 21 for supply of the electronic module 12 and the servomotors 8, 9. The battery compartment 20 is made in one piece with the housing 10 and as shown in FIG. 3, is located above the supply housing 4. To insert the batteries 21, the tubular battery compartment 20 has an insertion opening 22 which can be sealed tight via a cover 23 with a handle section 24. The cover 23 feasibly can be made of a elastomer material or has on the edge side, a corresponding seal so that a good sealing action results.

Figure 5:
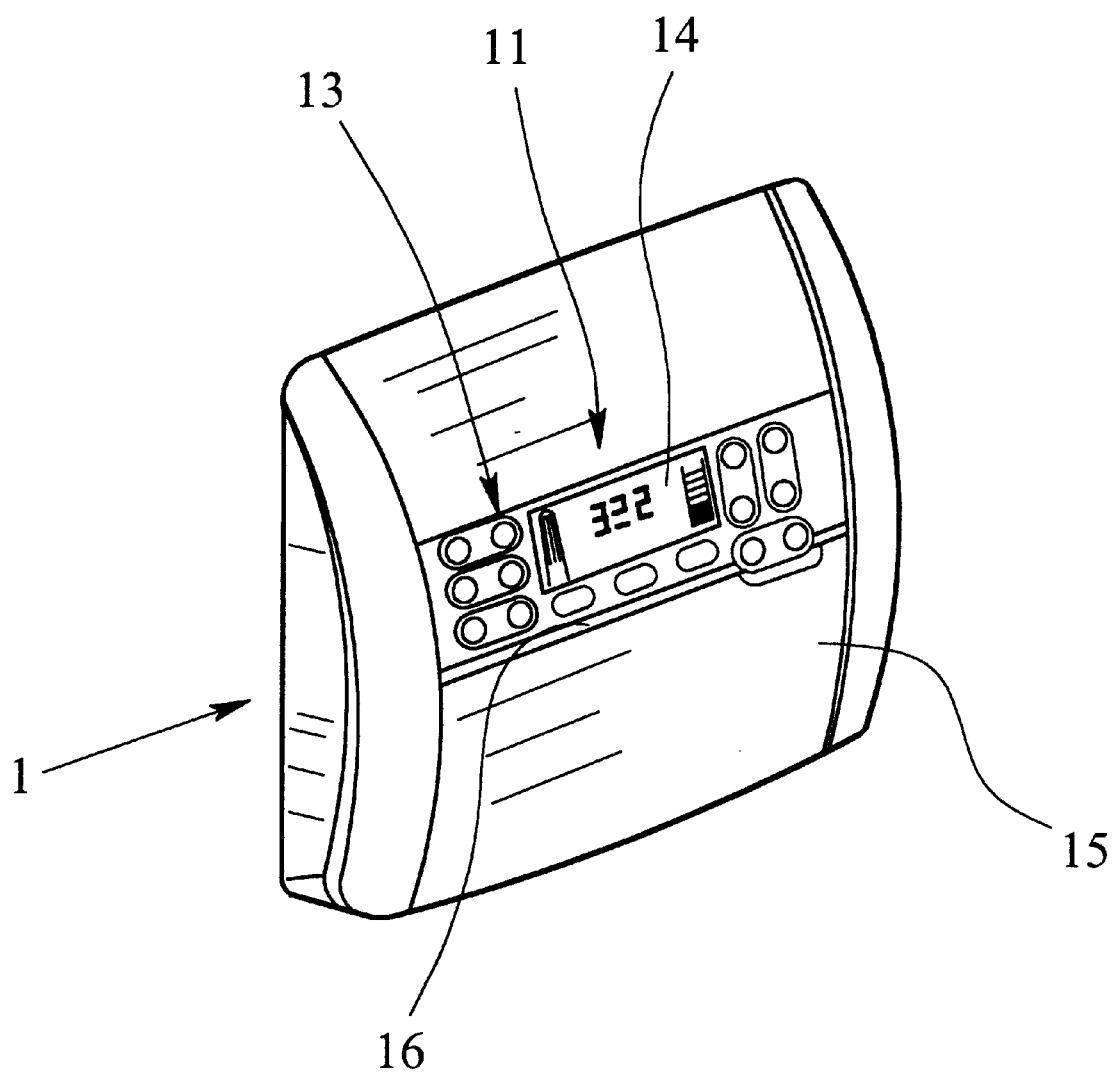

In this embodiment the housing 10 completely conceals the fitting body 3 and the valve means 7. When the housing 10 is attached to the installation wall 2 and the cover 15 is seated, the fitting body 3 and the valve means 7 cannot be seen (compare FIG. 5). In addition to optical-aesthetic advantages, there are also practical advantages, since with corresponding sealing of the housing 10 relative to the installation wall 2, water cannot penetrate into the area behind the housing 10. In any case, it should be pointed out that it is not absolutely necessary to use the housing to conceal the fitting body or the valve means. The housing with the control panel, and optionally, the electronic module can also simply be assigned to the fitting body and attached elsewhere. It is also possible for the housing to only partially conceal the fitting body or the valve means, but for the cover to fully conceal these components.

Figure 2:
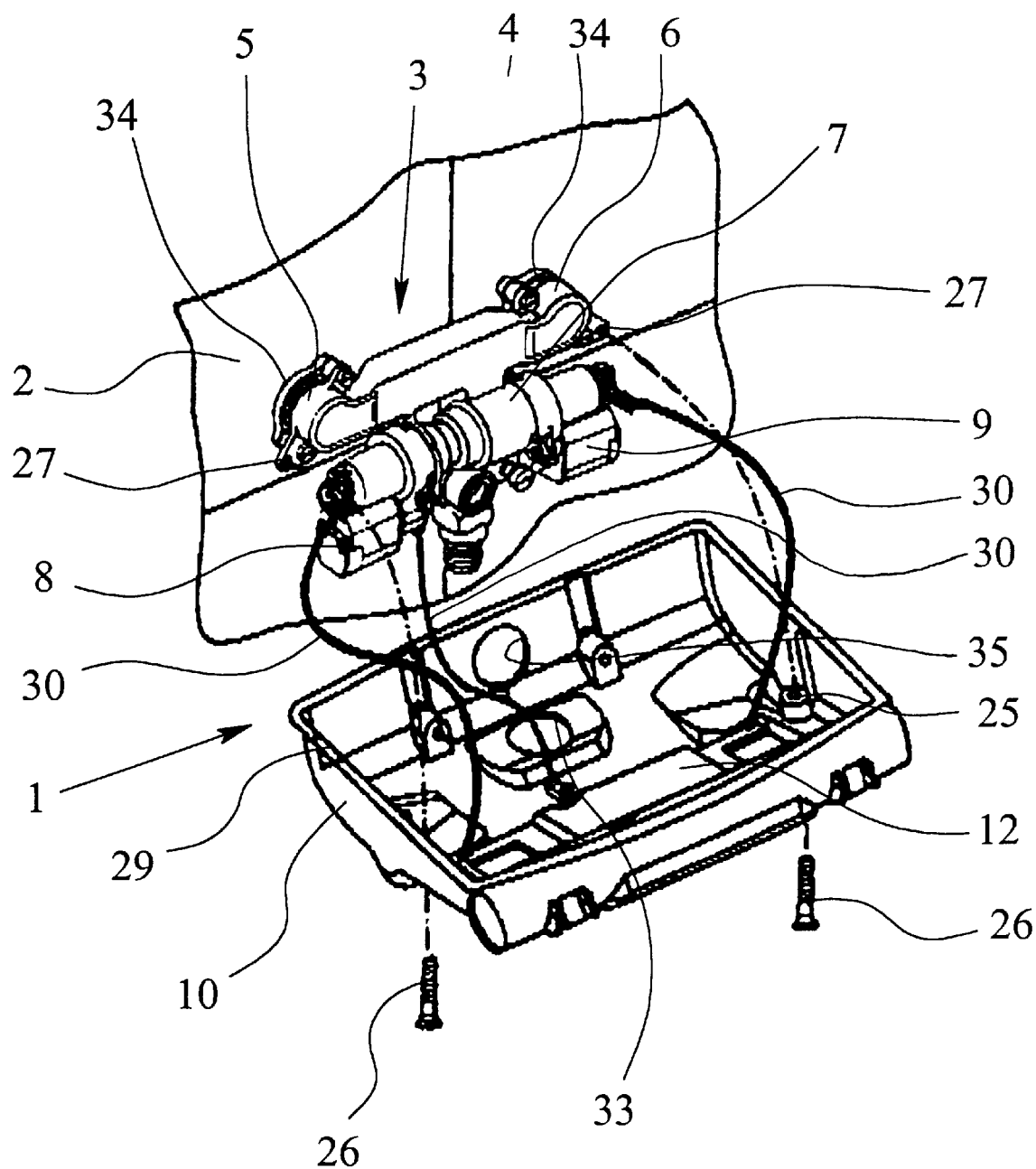
FIG. 2 shows a perspective view of the fitting as claimed in the invention with the housing removed.

The housing 10 is screwed to the fitting body 3. For this purpose, as is shown in FIG. 2, there are screws 26 which can be screwed from the outside into the corresponding threaded holes 27 on the fitting body 3 via corresponding openings 25 in the housing 10. The advantage of this type of attachment lies in that only the fitting body 3 requires attachment to the installation wall 2 via the corresponding screw connections with screws 28. Therefore there need be no additional holes in the installation wall 2 for attaching the housing 10. When the screws 26 are tightened to attach the housing 10, the latter is then pressed against the installation wall 2. To achieve a good sealing action, there should be a seal between the housing 10, preferably in the area of the peripheral outside edge 29 and the installation wall 2.

The electrical connection between the electronic module 12 and the battery compartment 20 with the servomotors 8, 9 takes place via connecting cables 30 with the corresponding plug connectors (not shown). The electrical connection can be easily established by using plug connectors (not shown).

As was explained above, because the supply housing 4 and the valve means 7 are located underneath one another, the fitting 1 is especially flat. So that the flat construction can also be preserved when using the housing 10, the electronic module 12, in the installed state of the housing 10, is located in front of the comparatively flat supply housing 4, while the battery compartment 20 is located above the supply housing 4 running parallel to an edge of housing 10 and parallel to a transverse axis of the cover 15. In this way, the free space between the fitting body 3 and the outside of the housing 10 is optimally used since, underneath the supply housing 4 of the fitting body 3, there is the comparatively low valve means 7 with the servomotors 8, 9.

In the area of the outlet 31 of the fitting body 3 there is a manually actuated cutoff 32. The manual cutoff 32 is used to actuate the fitting 1 if the motor-driven cutoff valve unit which is (not shown) should fail. To be able to operate the cutoff 32 easily, in the housing 10, there is the corresponding opening 33 so that after removing the cover 15, the cutoff 32 is accessible and can be actuated, for example, via a tool, without the need for disassembly of the housing 10.

Mounting of the fitting 1 as claimed in the invention proceeds as follows. First, the fitting body 3 with the corresponding eccentric connections 34 which project out of the installation wall 2 in a surface-type fitting is screwed via screws 28. Then, the connecting cables 30 are connected, on the one hand, to the housing 10, and on the other hand, to the servomotors 8, 9 (compare FIG. 2). Then, the housing 10 is screwed to the fitting body 3 via the screws 26, and in doing so, the housing 10 is pressed against the installation wall 2. In this state, the outlet 31 projects out of the corresponding opening 35 which is provided on the bottom of the housing 10.

After the housing 10 has been attached, the batteries 21 can be inserted into the battery compartment 20. Afterwards, the battery compartment 20 is sealed via the cover 23. At this point, for example, a shower hose is attached to the outlet 31, while between the outlet 31 and the opening 35 a seal may be provided. Finally, the cover 1 is first placed on the housing 10 and then swivelled on until the catch pin 19 engages. This results in the state shown in FIG. 5.

The fitting 1 can then be actuated via the control panel 11. The electronic module 12 is made such that the functions of opening, closing, quantity and temperature adjustment can be set via the keyboard 13 of the control panel 11. Furthermore, it is also possible to input certain individually user-related programs. Adjustment of the desired mixed water amount and temperature or the desired program is done via corresponding pressure and/or proximity switches (not numbered) on the keyboard 13.

What is claimed is:

1. Electrically operated fitting comprising:
a fitting body with a valve;
an electrically operated drive means for operating said valve;
a housing for at least partially covering at least one of said fitting body and said drive means when said housing is installed;
an electronic module positioned on said housing for controlling said drive means; and
a cover mountable on said housing to at least partially cover said housing, said cover including an opening lo allow access to said electronic module;

wherein said fitting body includes a supply housing through which hot and cold water flows, said valve and said drive means being located underneath said supply housing and said electronic module being located in front of said supply housing; and wherein fitting is battery operated and a battery compartment is located above said supply housing, a longitudinal axis of batteries held in said battery compartment being essentially parallel to a transverse axis of said cover.

2. Electrically operated fitting of claim 1, wherein said electronic module is attached to said housing and is sealed thereon to prevent liquid from entering said electronic module.

3. Electrically operated fitting of claim 1, wherein said battery compartment is accessible only with said cover removed.

4. Electrically operated fitting of claim 1, wherein said housing is attached to at least one of an installation wall, said drive means and said fitting body.

5. Electrically operated fitting of claim 1, further comprising means for pressing said housing against an installation wall.

6. Electrically operated fitting of claim 1, wherein said electronic unit is connected to said drive means via connecting cables having plug connectors.

7. Electrically operated fitting of claim 1, wherein said housing includes a seal for sealing said housing against an installation wall.

8. Electrically operated fitting of claim 1, wherein said electronic module is programmable to regulate the amount and temperature of the water.

9. Electrically operated fitting of claim 8, wherein said electronic module is programmable for a plurality of in individual users to regulate the amount and temperature of the water for each individual user.

10. Electrically operated fitting of claim 1, further comprising a manually actuated cutoff to allow manual operation of said valve.

11. Electrically operated fitting of claim 10, wherein said manually actuated cutoff is positioned proximate to an outlet of said electrically operated fitting; and wherein said housing includes an opening to allow access to said manually actuated cutoff, said opening being accessible only when said cover is removed from said housing.

12. Electrically operated fitting of claim 1, wherein said cover is detachably mounted to said housing.

13. Electrically operated fitting of claim 12, wherein said cover is mounted on said housing via a pivot bearing to allow said cover to be pivoted relative to said housing; and wherein the electrically operated fitting further comprises a catch connection positioned between said housing and said cover, opposite said pivot bearing, to prevent unintentional pivoting of said cover.

14. Electrically operated fitting of claim 1, wherein said battery compartment is tubular and includes an insertion opening to allow insertion of at least one battery.

15. Electrically operated fitting of claim 14, wherein said battery compartment also includes an elastomeric cover for sealing said insertion opening.

* * * * *